United States Patent [19]

Dickinson

[11] 4,187,506
[45] Feb. 5, 1980

[54] MICROWAVE POWER TRANSMISSION BEAM SAFETY SYSTEM

[76] Inventor: Robert A. Frosch, Administrator of the National Aeronautics and Space Administration, with respect to an invention of Richard M. Dickinson, La Crescenta, Calif.

[21] Appl. No.: 951,829

[22] Filed: Oct. 16, 1978

[51] Int. Cl.² .......................................... H04B 7/185
[52] U.S. Cl. .............................. 343/100 R; 310/306; 343/100 ST
[58] Field of Search ..................... 343/100 R, 100 ST; 310/306

[56] References Cited

U.S. PATENT DOCUMENTS

| | | | |
|---|---|---|---|
| 3,114,517 | 12/1963 | Brown | 343/100 ST UX |
| 3,174,705 | 3/1965 | Schiff et al. | 343/100 ST UX |
| 3,378,845 | 4/1968 | Welber | 343/100 ST |
| 3,434,678 | 3/1969 | Brown et al. | 343/100 ST UX |
| 3,535,543 | 10/1970 | Dailey | 310/306 |
| 3,781,647 | 12/1973 | Glasser | 322/2 |
| 3,852,755 | 12/1974 | Works et al. | 343/701 |
| 3,989,994 | 11/1976 | Brown | 322/2 |

*Primary Examiner*—Maynard R. Wilbur
*Assistant Examiner*—Richard E. Berger
*Attorney, Agent, or Firm*—Monte F. Mott; John R. Manning; Paul F. McCaul

[57] ABSTRACT

A system in which the characteristics of a microwave power transmission beam are controlled in accordance with power distribution profiles altered due to the detected presence or entrance of an object into the beam which causes changes that are perceived in various received, reflected and scattered power distribution profiles resulting over various receiving elements of the system. An analysis of these changes is made, the results of which are used to reshape, dim or douse the power beam in accordance with predetermined criteria. Additionally, a "FAIL SAFE" condition is obtained by employing a beam penetration tester, whose function is to repeatedly test the correct performance of the beam intrusion detecting scheme by presenting a minimal threshold scattering or absorbing cross section while crossing the power beam. If the beam penetration tester is undetected by the beam safety system, then the beam control is preconditioned to turn off the power beam. Conversely, if the beam penetration tester is successfully detected, then the power beam is allowed to remain on. The system comprises a microwave power beam radiator array, a microwave power beam receiving antenna array, the radiator array in one embodiment being located on an orbiting spacecraft and the receiving array being located at a ground station. Another embodiment provides a ground based transmitting array and a receiving array aboard an aircraft or airship.

23 Claims, 2 Drawing Figures

MICROWAVE POWER TRANSMISSION BEAM SAFETY SYSTEM

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

FIELD OF THE INVENTION

The invention relates to electromagnetic, wireless power transmission systems, and more particularly to apparatus and methods for controlling an electromagnetic transmission beam in accordance with power distribution profiles which are altered by an object entering the beam.

BACKGROUND OF THE INVENTION

Systems for transmitting rather low levels of power in the form of electromagnetic energy from one location to another have been extensively utilized such as in radio, TV and radar systems. These systems have also been proposed for much higher levels of power transfer between ground station and spacecraft, ground station and aircraft, and ground station and ground station. However, one problem inherent in such systems, especially as microwave beam power level increases, has been the potential hazard to life and property due to accidental intrusion into the power beam. The effects of high level microwave radiation (greater than 10 $mW/cm^2$) on personel and property are known to be at least thermal for long term exposure and can result in dehydration, cataract formation, and, at very high intensities, "steam" explosions in trapped fluid situations. However, near perfect reflectors, such as aluminum sheets, are unaffected at least up to flux densities as high as kilowatts per square centimeter as in Cassegrainian antenna reflectors.

The effects of medium level microwave radiation (1-10 $mW/cm^2$) on personnel are controversially theorized to be cardiovascular symptoms, white body cell shifts, temporary sterility, tension, nausea, brain arrhythmia and reduced sound perceptions. At lower levels (less than 1 $mW/cm^2$) there are certain brain wave and central nervous system responses, selected chromosone breaks and behavior modifications attributed to microwave radiation. These levels may be encountered in sidelobes or grating lobes of beamed power antenna patterns. Since a person cannot see or hear an approaching microwave beam or high level sidelobe, a system to protect personel and property from the damaging effects of an encounter with a microwave power transmission beam is desirable. As the power of these systems increases, protection becomes more and more important. The present invention provides a microwave power transmission beam control apparatus and method which solves the safety problem associated with conventional microwave beam systems by diminishing the level of or by removing microwave radiation from the vincinity of an object intersecting the beam, thus providing a capability for increasing the power transmitted by microwave beams without increasing the hazard to personnel and property encountering such beams.

SUMMARY OF THE INVENTION

Although reference has been and will be made to a microwave power transmission beam, it will be recognized that the method and means disclosed will be applicable to laser beams as well. For example, in the case of laser beam transmission, a power microwave beam may be simultaneously and coaxially transmitted and used to sense the presence of an object to reduce or shut off the laser power beam. Consequently, the term power beam will be used in the claims as a generic term to encompass the microwave power beam or a laser power beam. The term pilot beam then refers to a low power microwave beam, although for a microwave power beam, the pilot beam will be disposed within a power beam, and for a laser beam will be disposed around the laser beam.

In accordance with one embodiment of the present invention, a pilot beam transmitter is centrally disposed within a power beam receiving antenna array located at a ground station. Pilot beam receivers are diplexed to power beam radiator array elements located on a spacecraft, the power beam radiator array being positioned so that a microwave beam radiated therefrom will irradiate the power beam receiving antenna array at the ground station. A power distribution profile of the pilot beam as received at the spacecraft is compared to a predetermined power distribution profile by a power beam control computer located on the spacecraft in order to determine whether the beam path between the spacecraft and the ground station is unobstructed. An example would be to determine if maintenance personnel and their associated equipments or vehicles were removed from the face of a transmitting or receiving array. If it is unobstructed, the power beam radiator array on the spacecraft can be activated for transmission of microwave energy to the receiving antenna array located at the ground station. The received power distribution profile over the receiving antenna array is transmitted to the spacecraft via a data link subsystem and compared to a predetermined received power distribution profile, this comparison then indicating whether or not the beam path between the spacecraft and ground is being interrupted.

The invention also provides for comparison of a reflected power distribution profile at the power beam radiator array and a predetermined reflected power distribution profile, the results of which are indicative of whether a nearby intruding object is reflecting microwave energy back to the spacecraft. In order to further enhance sensitivity the invention also provides for use of a series of spaced-apart receiving antenna subarrays at power beam sidelobe null locations in the vicinity of the ground station receiving antenna array. Power scattered by an object in the power beam will change the power distribution profile seen by these subarrays. The scattered power distribution profile of these receiving antenna subarrays is also transmitted to the power beam control computer on the spacecraft via the data link subsystem and compared to a predetermined scattered power distribution profile. The invention further provides for the placing of receiving antenna subarrays apart from the power beam radiator array located on the spacecraft, the scattered power distribution profile of these subarrays again being compared to a predetermined scattered power distribution profile. The results of all the above-mentioned power distribution profile comparisons are used to generate signals for controlling the power, shape and direction of the microwave power beam being transmitted from the spacecraft to the ground, thereby insuring that an object intruding into the microwave power transmission beam will not be harmed. A beam penetration tester is also provided, the tester comprising a microwave opaque object to be inserted in the power beam. If a response due to the insertion is not within predetermined limits, the power beam is immediately turned off.

DESCRIPTION OF PREFERRED EMBODIMENTS

As required, a specific embodiment of the invention is disclosed herein. This embodiment exemplifies the novel concepts of the invention, and is currently considered to be the best mode for practicing the invention. However, it is to be recognized that modifications and equivalents may readily occur to those skilled in the art, such as other power distribution profiles which could be utilized for detection of an object entering the microwave power transmission beam. Accordingly, the specific embodiment disclosed is only representative in providing a basis for the claims which define the scope of the present invention.

As noted hereinbefore, the invention provides a means and method for controlling an electromagnetic power beam in accordance with the presence of an object being irradiated by the beam. Control of the beam may take the form of reducing the power, changing the shape, diverting or dousing the beam, i.e., turning the beam off completely. Control is initiated by comparing a predetermined power distribution profile and an actual power distribution profile of transmitted, reflected, and scattered microwave energy across various receiving antenna surfaces of the system. These profiles are affected by the presence of an object within the microwave power transmission beam which reflects, absorbs or scatters some of the microwave energy. The profile comparisons provide the information necessary to generate control signals for altering the characteristics of the microwave power transmission beam.

Figure 1:
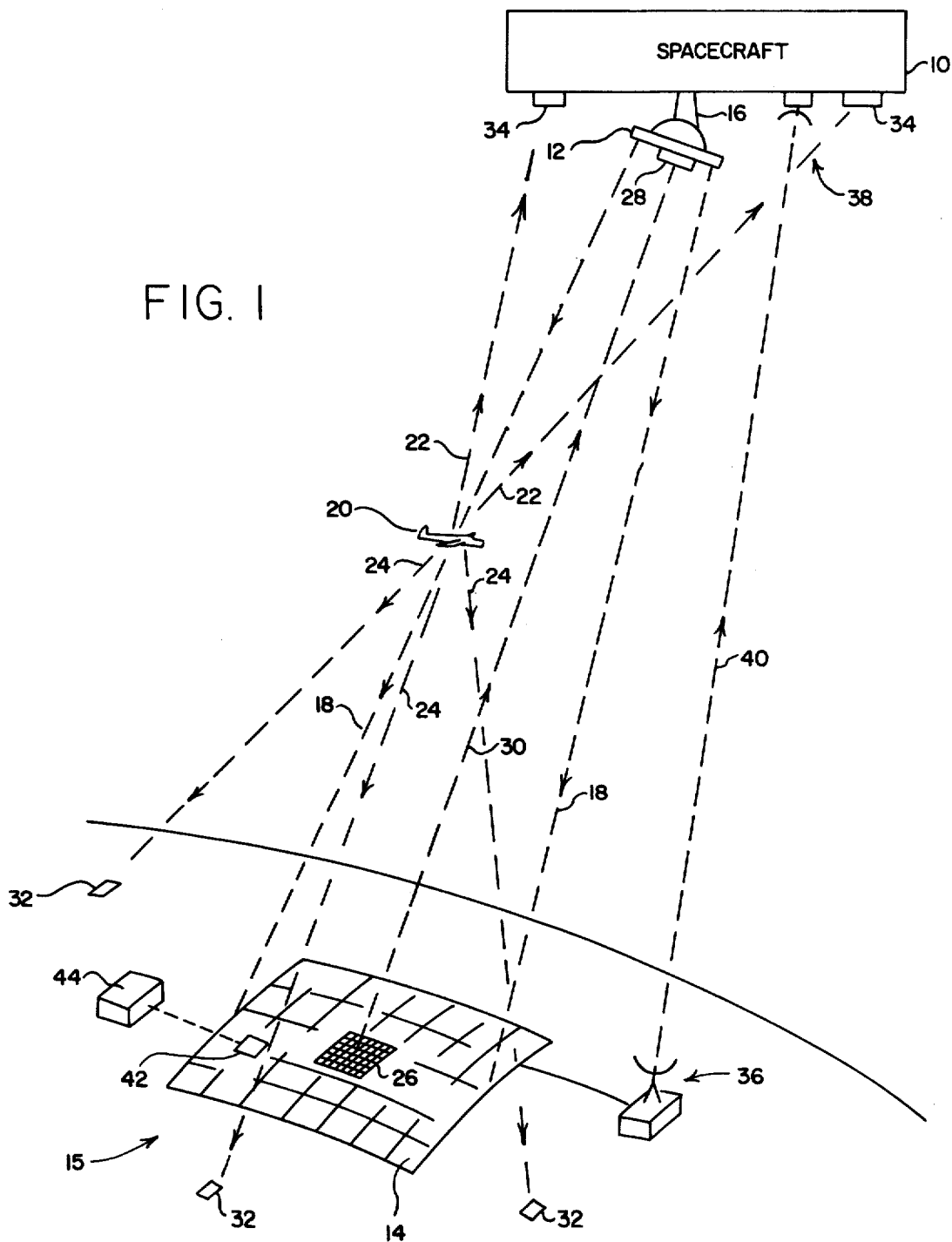
FIG. 1 illustrates schematically the major components of a system according to the present invention.

Referring to FIG. 1, an orbiting spacecraft 10 has positioned therein a power beam radiator array 12 which is oriented so that microwave energy radiated therefrom will irradiate a power beam receiving antenna array 14 located at a ground station 15. A radiator array positioning means 16 on the spacecraft is provided so that radiation from the radiator array 12 will continuously irradiate the receiving antenna array 14 regardless of the position of the spacecraft with respect to the ground station. Solar energy collected at the spacecraft, which could be derived from a solar cell array not shown, is converted to microwave energy and transferred from the spacecraft 10 to the ground station via a microwave power beam 18 for subsequent use.

In the specific embodiment shown, an orbiting spacecraft is utilized as an energy collector, and a ground station is used as an energy receiver. However, the invention is not limited to a spacecraft to ground station application. The concepts are equally applicable for energy transmission from a ground station to a spacecraft, from a ground station to an aircraft, from an aircraft to a ground station, and from one ground station to another ground station.

As previously explained, sufficient energy levels can be obtained within the microwave power transmission beam 18 to seriously injure, and perhaps kill living organisms which remain within the beam for any length of time. By way of example, an aircraft 20 is shown entering the microwave beam 18. As the aircraft enters the beam, it reflects some of the microwave energy as shown at 22 and either absorbs or scatters some of the energy as shown at 24. The absorbed or reflected energy will alter a reflected power distribution profile across the face of the power beam radiator array 12 and a received power distribution profile across the face of the receiving antenna array 14. A comparison of the power distribution profiles being experienced with predetermined power distribution profiles, both from the radiator array and receiving antenna array, will produce characteristics indicative of the aircraft entering the power transmission beam. The characteristics include size, absorption, reflectivity, and speed. Means to alter the power transmission beam, either by reducing the power of the beam, changing the beam shape, diverting the beam so that it no longer irradiates the intruding object, or dousing the beam is provided as will be discussed more fully below.

In addition to the reflected power distribution profile across the face of the radiator array 12, and the received power distribution profile across the receiving antenna array 14, another power distribution profile is provided by a pilot beam transmitter 26 centrally disposed in the power beam receiving antenna array 14 and a series of pilot beam receivers 28 diplexed to central elements of the power beam radiator array 12. Energy is transmitted from the pilot beam transmitter 26 as shown at 30. The purpose of the pilot beam is to provide an alternate or additional indication of the intrusion of an object, its presence being indicated by a reduced signal received by the pilot beam receivers 28. The transmitter 26 radiates at a frequency close to but not exactly equal to that of the microwave power transmission beam 18. The difference allows the pilot beam receivers 28 to discriminate between changes in the pilot beam 30 and reflected radiation from the aircraft 20 as shown at 22.

In order to further enhance sensitivity of the system, a plurality of receiving antenna subarrays 32 are spaced apart but near the power beam receiving antenna array 14 so that as energy (shown at 24) is scattered by the aircraft 20, the power distribution profile at the spaced-apart subarrays 32 will change. It is felt that it is particularly useful to place the receiving antenna subarrays 32 at sidelobe nulls of the power transmission beam 18. Thus, as energy of the power transmission beam is scattered, the receiving antenna subarrays 32 will experience an upward level change indicative of an object entering the transmission beam 18. In a similar manner, another plurality of receiving antenna subarrays 34 are disposed on the spacecraft so that energy scattered by the intruding aircraft 20 can also be detected.

The received power distribution profile of the receiving antenna array 14 and the scattered power distribution profile of the spaced-apart antenna subarrays 32 are transmitted to the spacecraft by a data link subsystem comprising a ground station transmitter 36 and a spacecraft receiver 38. The data link transmitter function could be provided by the pilot beam transmitter, and the function of the receiver could be provided by the pilot beam receiver 28. A computer on the spacecraft compares predetermined power distribution profiles with the actual power distribution profiles of the receiving antenna array 14 and the spaced-apart receiving antenna subarrays 32. The results of the comparison indicate whether an object is in the power transmission beam 18. It would be equally possible to have the power distribution profile comparisons made on the ground. The results of the comparisons would then be transmitted to the spacecraft via a data link beam 40.

In order to properly check operation of the system, a beam penetration tester 42 is provided to interrupt the power beam, the beam tester being a mechanical device opaque to microwave energy that can be moved at preset speed and with a predetermined direction or distance into the power transmission beam 18 by a mechanism 44. The resulting power distribution profiles can then be used to verify proper operation of the system. The mechanism shown schematically is so constructed that it can be positioned over any portion of the receiving antenna array 14 in order to test the beam shape alteration circuitry on the spacecraft 10. One arrangement for this mechanism could consist of a nylon line stretched across the array 14. The opaque device suspended on the nylon line could then be pulled across the array as required, and dollys on tracks parallel to the sides of the array 14 could be used to move the line to different positions across the array. Alternatively, a pilotless vehicle could be flown across the array.

Figure 2:
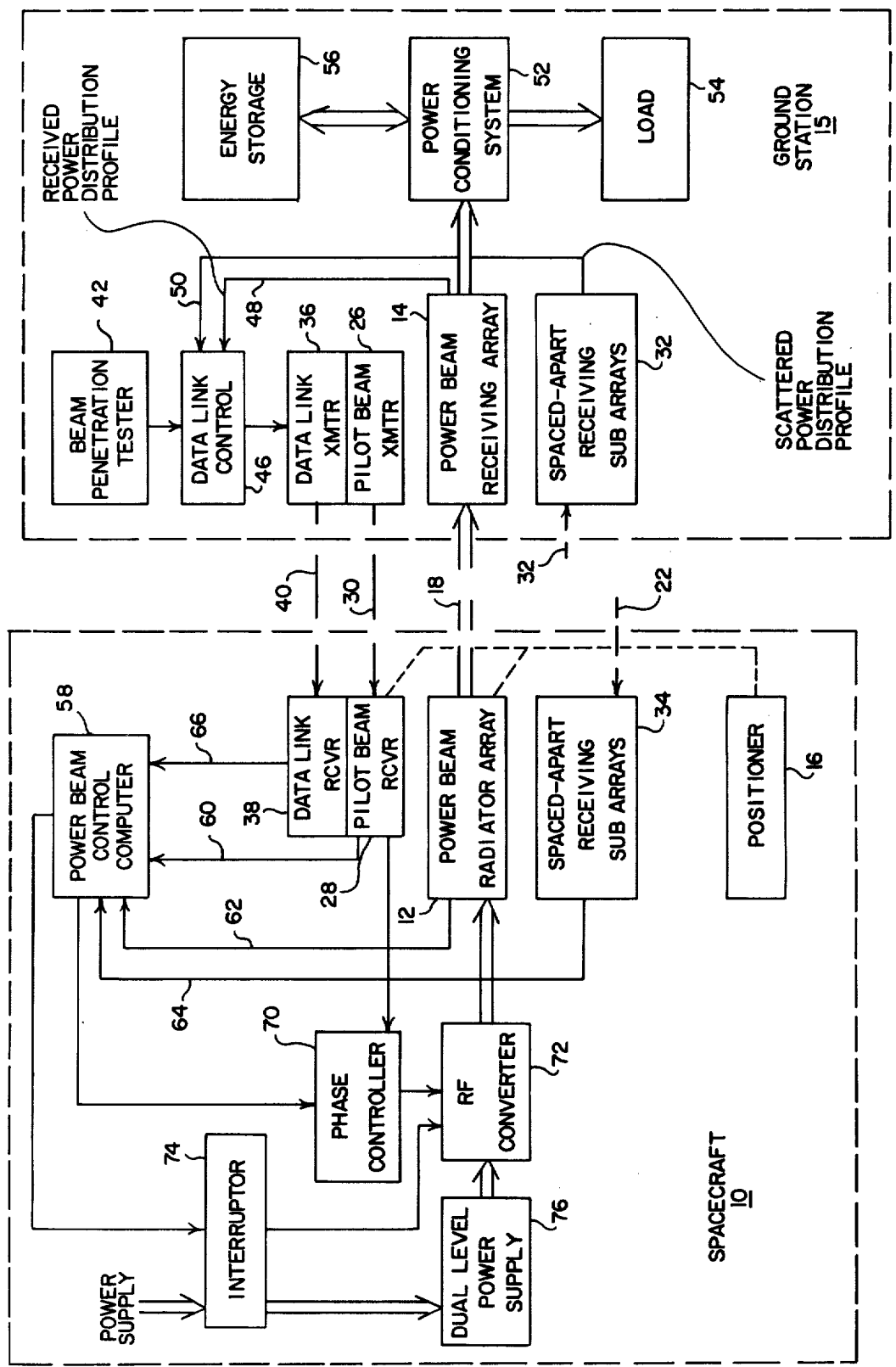
FIG. 2 is a block diagram of a microwave power transmission beam control system according to the present invention.

Operation of the system can be understood by referring to the functional blocks shown in FIG. 2. The power beam radiator array 12 is positioned by the positioning means 16 so that the power transmission beam 18 irradiates the receiving antenna array 14. The power beam radiator array 12 is constructed to minimize the angle subtended by the power transmission beam 18, and the receiving antenna array 14 is large enough to intersect substantially all of the energy radiated from the radiator array 12. For the spacecraft application herein described, a typical receiving antenna array might be 100 meters square. Although many types of array elements could be utilized both for the radiator array 12 and the receiving antenna array 14, typical elements are dipoles, waveguide slots, or parabolic dishes.

Referring now to the ground station 15, shown in block diagram on the right of FIG. 2, the received power distribution profile across the face of the receiving antenna array 14 is transferred to a data link control unit 46 via a transmission line 48. In addition, the scattered power distribution profile from the receiving antenna subarrays 32 is also transferred to the data link control unit 46 via a transmission line 50. Location of the beam penetration tester 42 with respect to the power beam receiving antenna array 14 is also provided to the data link control unit 46. The data link control unit multiplexes these three inputs, plus other information necessary for timing and synchronization, the multiplexed signal being supplied to the data link transmitter 36. The data link beam 40 is radiated by the data link transmitter 36 and received by the data link receiver 38 on the spacecraft 10. The ground station 15 further provides standard processing equipment including a power conditioning system 52 which converts microwave energy from the receiving antenna array 14 to other energy forms appropriate for a specific application, examples of which include conversion of microwave energy to heat energy, electrical energy and radiation energy. A load for the energy is represented at 54, and should storage of the energy be desirable, an energy storage capability is shown at 56.

On the spacecraft 10, pilot beam receivers 28, which are diplexed to appropriate power beam radiator array elements, receive the pilot beam 30 radiated from the pilot beam transmitter 26 and transfer a pilot beam received power distribution profile to a power beam control computer 58 via a pilot beam transfer line 60. The reflected power distribution profile across the face of the power beam radiator array 12 is also transferred to the power beam control computer 58 via a transfer line 62. The scattered power distribution profile of the receiving antenna subarrays 34 spaced-apart from the power beam radiator array 12 is also transferred to the power beam control computer 58 via a transfer line 64. The output of the data link receiver 38 is supplied to the power beam control computer 58 via a transfer line 66. Thus, inputs to the power beam control computer 58 comprise the received power distribution profile across the ground station power beam receiving antenna array 14, a scattered power distribution profile across the ground station receiving antenna subarrays 32, the pilot beam received power distribution profile from the diplexed pilot beam receivers 28, the reflected power distribution profile across the face of power beam radiator array 12, the scattered power distribution profile across the spacecraft receiving antenna subarrays 34, and the location of the beam tester 42 with respect to the receiving antenna array 14. Through digital processing techniques well known in the art, the power beam control computer 58 takes all of the above-mentioned profile inputs and compares them to corresponding predetermined power distribution profiles stored in the computer 58. Results of this comparison will show if deviations from predetermined profiles are present, and will pin-point those specific areas in which any deviations are occuring. For example, if the receiving antenna array 14 shows a received power distribution profile anomaly in one quadrant, while other quadrants are indicating normal profiles, the computer may conclude that the intruding object is entering the power beam 18 in that quadrant. If the object is moving at an extremely slow rate, the power beam control computer 58 may conclude that the beam 18 should not be interrupted but rather should be reshaped to avoid the intruding object. Such a redirection can be effected by a phase controller 70 which controls the phase of RF energy supplied by an RF converter 72 to the power beam radiator array 12. However, if a substantial portion of the microwave power transmission beam 18 is blocked the power beam control computer 58 can cause a power source interrupter 74 to either cut-off all power to the power beam radiator array 12 by deactivating the RF converter 72, or can reduce the power level of the RF converter output 72 by control of a dual level power supply 76.

In operation, the system is activated by turning on the ground station pilot beam transmitter 26 and orienting the spacecraft radiator array 12 by the array positioning means 16 so that the signal received by the pilot beam receivers 28 is maximized, thus ensuring that the power transmission beam 18 will be directed at the receiving antenna array 14. The initial energy level of the pilot beam 30 is chosen so that living organisms within the beam 30 will not be harmed. Also, the pilot beam received power profile from the diplexed pilot beam receivers 28 is compared by the power beam control computer 58 to a predetermined profile, this comparison indicating whether the beam path between the space station 10 and the ground station 15 is unobstructed. Having thus ascertained through use of the pilot beam 30 that the power beam radiator array 12 is oriented properly with respect to the receiving antenna array 14 and the power beam 18 path is unobstructed, the power beam control computer 58 provides a signal to the power source interrupter 74 to pass a low power level from the dual-level power supply 76 to the RF converter 72 whose output is radiated as microwave energy from the power beam radiator array 12. The power beam control computer 58 then compares the received power distribution profile across the face of the receiving antenna array 14 to a corresponding predetermined power distribution profile. Upon determining that there is still no obstruction in the path between the power beam radiator array 12 and the receiving antenna array 14, the power beam control computer 58 sends a second signal to the interrupter 74 thereby activating a high level power output from the dual-level power supply 76 to the RF converter 72 for radiation from the radiator array 12. Thus, one can appreciate that through the above-described sequence, the power beam radiator array 12 can begin transmitting a high power microwave transmission beam 18 without fear of having the beam damage an object in the beam path. Having thus established the high power transmission beam 18, the power beam control computer 58 then continues to monitor the preprogrammed beam tester intrusions into the beam and all of the received power distribution profiles, the reflected power distribution profile and the scattered power distribution profiles as above described, and to compare those profiles with corresponding predetermined power distribution profiles. The computer 58 uses the results of these comparisons to control the phase controller 70 and the interrupter 74.

In summary, the invention provides a means and method to control an electromagnetic power beam system by comparing power distribution profiles across various receiving elements of the system and predetermined power distribution profiles. The results of these comparisons are used to shape, divert, dim or douse the power transmission beam. Thus an object entering the beam, through its effect on the various power distribution profiles, will result in the system rendering the beam harmless with respect to the entering object.

Although particular embodiments of the invention have been described and illustrated herein, it is recognized that modifications and variations may readily occur to those skilled in the art, and consequently it is intended that the claims be interpreted to cover such modifications and equivalents.

What is claimed is:

1. An electromagnetic power beam transmission system comprising:
   a power beam radiator;
   a power beam receiving array;
   source means for supplying power to be radiated by said radiator and received by said receiving array, said radiated power comprising said electromagnetic power transmission beam;
   power profile sensing means for determining if an object is within said power transmission beam; and
   means for controlling said source means in response to said power profile sensing means.

2. The system of claim 1 in which said power profile sensing means comprises:
   means for determining a first power distribution profile caused by said power transmission beam over said receiving array; and
   means for comparing said first power distribution profile and a first predetermined power distribution profile, a first predetermined difference of which is indicative of an object being within said power transmission beam.

3. The system of claim 2 in which said power profile sensing means further comprises:
   a first plurality of receiving subarrays located adjacent to, but spaced-apart from, said receiving array;
   means for determining a second power distribution profile caused by said power transmission beam over said first plurality of receiving subarrays and;
   means for comparing said second power distribution profile and a second predetermined power distribution profile, a second predetermined difference of which is indicative of an object being within said power transmission beam.

4. The system of claim 3 in which said power profile sensing means further comprises:
   a second plurality of receiving subarrays located adjacent to, but spaced-apart from, said power beam radiator array;
   means for determining a third power distribution profile over said second plurality of receiving subarrays; and
   means for comparing said third power distribution profile and a third predetermined power distribution profile, a third predetermined difference of which is indicative of an object being within said power transmission beam.

5. The system of claim 1 further comprising:
   a pilot beam receiving means located near said power beam radiator;
   a pilot beam transmitter located near said receiving array and disposed so that a low power microwave pilot beam transmitted therefrom will irradiate said pilot beam receiving means;
   means for determining a fourth power distribution profile over said pilot beam receiving means; and
   means for comparing said fourth power distribution profile and a fourth predetermined power distribution profile, a fourth predetermined difference of which is indicative of an object being within said low power microwave pilot beam.

6. The system of claim 5 in which said pilot beam receiving means comprises said power beam radiator array and a plurality of diplexed pilot beam receivers.

7. The system of claim 1 including means for verifying proper operation of the system.

8. The system of claim 2 further comprising:
   means for determining a power distribution profile over said power beam radiator reflected from an object within said power transmission beam; and
   means for comparing said reflected power distribution profile and a predetermined reflected power distribution profile, a predetermined difference of which is indicative of an object being within said power transmission beam.

9. The system of claim 1 in which said control means comprises means to interrupt said power beam in response to said power profile sensing means.

10. The system of claim 3 further comprising a data link subsystem for providing said first power distribution profile and said second power distribution profile to said comparing means.

11. The system of claim 3 further comprising:
a beam interrupt means;
means to insert said beam interrupt means in said power transmission beam;
means for determining an interruption power distribution profile over said receiving array and said spaced-apart receiving subarrays; and
means for comparing said interruption power distribution profile and a predetermined interruption power distribution profile, a predetermined difference of which is indicative of proper system operation.

12. In a microwave power transmission beam system having a microwave power beam radiator array, a microwave power beam receiving antenna array, means for providing microwave power to said radiator array for formation of a microwave power transmission beam, means for disposing said radiator array so that microwave power transmitted therefrom will irradiate said receiving antenna array, the improvement comprising:
power profile sensing means for determining if an object is within said microwave power transmission beam; and
means for controlling said microwave power providing means in accordance with an output from said power profile sensing means.

13. The improvement of claim 12 in which said power profile sensing means comprises:
means for comparing a received power distribution profile across said receiving antenna array and a predetermined received power distribution; and
means for comparing a reflected power distribution profile across said power beam radiator array and a predetermined reflected power distribution.

14. The improvement of claim 13 further comprising:
a pilot beam receiving means;
a pilot beam transmitter, said pilot beam receiving means and said pilot beam transmitter disposed so that a pilot beam radiated therebetween will be within said power transmission beam; and
said power profile sensing means further comprising means for comparing a received pilot beam power distribution profile across said pilot beam receiving means and a predetermined received pilot beam power distribution profile.

15. The improvement of claim 14 further comprising:
a first plurality of receiving antenna subarrays located adjacent to, but spaced-apart from, said microwave power beam receiving antenna array;
a second plurality of receiving antenna subarrays located adjacent to, but spaced-apart from, said microwave power beam radiator array; and
said power profile sensing means further comprising means for comparing a first scattered power distribution profile across said first plurality of receiving antenna subarrays and a predetermined first scattered power distribution profile, and means for comparing a second scattered power distribution profile across said second plurality of receiving antenna subarrays and a predetermined second scattered power distribution profile.

16. In a method of transmitting a microwave power beam between a microwave power beam radiator array and a microwave power beam receiving antenna array, the improvement comprising:
sensing power profiles to determine if an object is within said microwave power transmission beam; and
controlling said microwave power transmission beam in accordance with said sensing step.

17. The improved method of claim 16 in which said sensing step further comprises:
comparing a received power distribution profile across said power beam receiving antenna array and a predetermined received power distribution profile; and
comparing a reflected power distribution profile across said power beam radiator array and a predetermined reflected power distribution.

18. The improved method of claim 17 further comprising:
transmitting a pilot beam between a pilot beam transmitter and a pilot beam receiving means, said pilot beam transmitter and receiving means being disposed so that said pilot beam is contained within said microwave power beam; and
said sensing step further comprises comparing a received pilot beam power distribution profile across said pilot beam receiving means and a predetermined received pilot beam power distribution profile.

19. The improved method of claim 18 in which said sensing step further comprises:
comparing a first scattered power distribution profiles across a first plurality of receiving antenna subarrays located adjacent to, but spaced apart from, said microwave power beam receiving antenna array, and a predetermined first scattered power distribution profile; and
comparing a second scattered power distribution profile across a second plurality of receiving antenna subarrays located adjacent to, but spaced apart from, said microwave power beam radiator array, and a predetermined second scattered power distribution profile.

20. The improved method of claim 19 including the step of passing a beam penetration tester through said microwave power beam in a known pattern to produce a power distribution profile for use in verifying proper beam controlling operation.

21. The method of claim 16 in which said power beam radiator array is located on an orbiting spacecraft and said receiving antenna array is located on earth.

22. The method of claim 16 in which said receiving array is located on an aircraft and said power beam radiator array is located on the ground.

23. The method of claim 16 in which said power beam radiator array and said receiving antenna array are both located on the ground.

* * * * *